(12) United States Patent
Ishida et al.

(10) Patent No.: US 11,011,758 B2
(45) Date of Patent: May 18, 2021

(54) FUEL CELL AND METALLIC SEPARATOR WITH VARIED BEAD SEAL WIDTH AND ANGLE

(71) Applicant: HONDA MOTOR CO., LTD., Tokyo (JP)

(72) Inventors: Kentaro Ishida, Wako (JP); Masaaki Sakano, Wako (JP); Xi Yang, Bloomfield Hills, MI (US); Liang Xi, Northville, MI (US); Siguang Xu, Rochester Hills, MI (US); Richard Blakeley, Ortonville, MI (US)

(73) Assignee: Hond Motor Co., Ltd., Tokyo (JP)

( * ) Notice: Subject to any disclaimer, the term of this patent is extended or adjusted under 35 U.S.C. 154(b) by 240 days.

(21) Appl. No.: 15/423,073

(22) Filed: Feb. 2, 2017

(65) Prior Publication Data
US 2018/0219233 A1   Aug. 2, 2018

(51) Int. Cl.
| | |
|---|---|
| H01M 8/0258 | (2016.01) |
| H01M 8/1004 | (2016.01) |
| H01M 8/0206 | (2016.01) |
| H01M 8/0286 | (2016.01) |
| H01M 8/0276 | (2016.01) |
| H01M 8/0282 | (2016.01) |
| H01M 8/1018 | (2016.01) |

(52) U.S. Cl.
CPC ....... *H01M 8/0258* (2013.01); *H01M 8/0206* (2013.01); *H01M 8/0276* (2013.01); *H01M 8/0282* (2013.01); *H01M 8/0286* (2013.01); *H01M 8/1004* (2013.01); *H01M 2008/1095* (2013.01); *H01M 2250/20* (2013.01)

(58) Field of Classification Search
CPC ............. H01M 8/0258; H01M 8/0286; H01M 8/0206; H01M 8/1004; H01M 8/0276; H01M 8/0282; H01M 2008/1095; H01M 2250/20; Y02T 90/32
See application file for complete search history.

(56) References Cited

U.S. PATENT DOCUMENTS

| | | |
|---|---|---|
| 5,472,801 A | 12/1995 | Mattejat et al. |
| 6,605,380 B2 | 8/2003 | Chen et al. |
| 7,008,584 B2 | 3/2006 | Inoue et al. |

(Continued)

FOREIGN PATENT DOCUMENTS

| | | | | |
|---|---|---|---|---|
| JP | 2007-042510 | * | 2/2007 | .............. H01M 8/02 |
| WO | WO2016/059215 | * | 4/2016 | .......... H01M 8/0202 |

OTHER PUBLICATIONS

Machine translation of JP 2007-042510, 2007 (Year: 2007).*

*Primary Examiner* — Kwang Han
(74) *Attorney, Agent, or Firm* — Carrier Blackman & Associates, P.C.; William D. Blackman; Joseph P. Carrier

(57) ABSTRACT

A power generation cell (fuel cell) includes a membrane electrode assembly and first and second metallic separators arranged respectively on opposite sides of the membrane electrode assembly. An oxygen containing gas supply passage, a communication passage bead section (bead seal) that surrounds the oxygen containing gas supply passage, and a bridge section are disposed on the first metallic separator. At a location where the bridge section is disposed, the width of a root section of the communication passage bead section is greater than the width of the root section of the communication passage bead section at other locations thereof.

11 Claims, 12 Drawing Sheets

(56) References Cited

U.S. PATENT DOCUMENTS

| | | |
|---|---|---|
| 7,718,293 B2 | 5/2010 | Strobel et al. |
| 2006/0054664 A1 | 3/2006 | Strobel et al. |
| 2013/0177827 A1* | 7/2013 | Okabe ................. H01M 8/0271 429/434 |
| 2017/0324099 A1* | 11/2017 | Stoehr ..................... C25B 9/203 |

* cited by examiner

FUEL CELL AND METALLIC SEPARATOR WITH VARIED BEAD SEAL WIDTH AND ANGLE

BACKGROUND OF THE INVENTION

Field of the Invention

The present invention relates to a fuel cell and a metallic separator for a fuel cell.

Description of the Related Art

For example, in a solid polymer electrolyte fuel cell, an electrolyte membrane (polymer ion exchange membrane) is interposed between an anode and a cathode in order to form a membrane electrode assembly (MEA). In the fuel cell, the membrane electrode assembly is sandwiched between separators (bipolar plates) in order to form a power generation cell (unit cell). A fuel cell stack comprising a stacked body in which a predetermined number of power generation cells are stacked together, for example, is mounted in a fuel cell vehicle (fuel cell electric vehicle, etc.).

With such a fuel cell stack, there are situations in which metallic separators that serve as separators are used therewith. At this time, in order to prevent leakage of a coolant or reactant gases including an oxygen containing gas and a fuel gas, seal members are provided on the metallic separators (see, for example, the specification of U.S. Pat. No. 7,008,584).

For such seal members, elastic rubber seals made of fluorine-based rubber or silicone or the like are used, which leads to a rise in costs. Thus, for example, as disclosed in the specification of U.S. Pat. No. 7,718,293, instead of such elastic rubber seals, a structure has been adopted in which convexly shaped bead seals are formed in the metallic separators.

SUMMARY OF THE INVENTION

In order to separately supply and discharge the reactant gases and the coolant, passages that penetrate through the metallic separators in the stacking direction are provided in the stacked body of the fuel cell, and the respective passages in the metallic separators are surrounded separately by bead seals. Further, in order for the reactant gases to flow between the power generating region and the passages, connecting flow fields (bridge sections) that communicate between the interior and exterior of the bead seals are provided in the metallic separators. Therefore, in the bead seals, a large variance occurs in the surface pressure (contact pressure at tops of the bead seals) between regions where the connecting flow fields are provided and other regions (regions where the connecting flow fields are not provided).

The present invention has been devised in consideration of the aforementioned problems, and has the object of providing a fuel cell and a metallic separator for a fuel cell, which are capable of reducing to a small amount variances that occur in the surface pressure between regions where the connecting flow fields are provided in the bead seals and other regions thereof.

To achieve the above object, the present invention is characterized by a fuel cell comprising a membrane electrode assembly in which electrodes are disposed respectively on opposite sides of an electrolyte membrane, and metallic separators arranged respectively on opposite sides of the membrane electrode assembly, wherein passages through which a fluid, the fluid being a fuel gas, an oxygen containing gas, or a coolant, flows in a stacking direction of the membrane electrode assembly and the metallic separators, fluid flow fields through which the fluid flows along surfaces of the metallic separators, connecting flow fields that communicate between the passage and the fluid flow fields, and bead seals that project in the stacking direction and surround the passages are provided on the metallic separators, the connecting flow fields being formed to communicate between inner and outer sides of the bead seals. Further, at a location where the connecting flow fields are disposed, a width of a root section of the bead seals is greater than a width of the root section of the bead seals at other locations thereof.

In the above-described fuel cell, the bead seals preferably are formed with a wavy shape as viewed in plan.

In the above-described fuel cell, widths of a top section of the bead seals in a direction at which the bead seals project preferably are equal at the location where the connecting flow fields are disposed and at the other locations thereof.

In the above-described fuel cell, the bead seals are formed with a wavy shape as viewed in plan; and at regions corresponding to apexes of bent portions forming the wavy shape on the bead seals, through holes that make up at least portions of the connecting flow fields preferably are provided on both sides of a convex shape of the bead seals.

In the above-described fuel cell, the connecting flow fields preferably include through holes provided on both sides of a convex shape of the bead seals, and tunnels connected to the through holes.

Further, the present invention is characterized by a metallic separator for a fuel cell on which there are provided a passage that penetrates in a thickness direction and through which a fluid flows, the fluid being a fuel gas, an oxygen containing gas, or a coolant, a fluid flow field through which the fluid flows along a surface of the separator, a connecting flow field that communicates between the passage and the fluid flow field, and a bead seal that projects in the thickness direction and surrounds the passage, the connecting flow field being formed to communicate between inner and outer sides of the bead seal. Further, at a location where the connecting flow field is disposed, a width of a root section of the bead seal is greater than a width of the root section of the bead seal at other locations thereof.

In the above-described metallic separator for a fuel cell, the bead seal preferably is formed with a wavy shape as viewed in plan.

In the above-described metallic separator for a fuel cell, widths of a top section of the bead seal in a direction at which the bead seal projects preferably are equal at the location where the connecting flow field is disposed and at the other locations thereof.

In the above-described metallic separator for a fuel cell, preferably, the bead seal is formed with a wavy shape as viewed in plan, and at regions corresponding to apexes of bent portions forming the wavy shape on the bead seal, through holes that communicate between the passage and the flow field are provided on both sides of a convex shape of the bead seal.

In the above-described metallic separator for a fuel cell, preferably, through holes that communicate between the passage and the flow field are provided on both sides of a convex shape of the bead seal, and tunnels are connected to the through holes.

Further, the present invention is characterized by a metallic separator for a fuel cell on which there are provided a passage that penetrates in a thickness direction and through which a fluid flows, the fluid being a fuel gas, an oxygen containing gas, or a coolant, a fluid flow field through which the fluid flows along a surface of the separator, a connecting flow field that communicates between the passage and the fluid flow field, and a bead seal that projects in the thickness direction and surrounds the passage, the connecting flow field being formed to communicate between inner and outer sides of the bead seal, and an angle on both sides of a convex shape of the bead seal with respect to a plane perpendicular to the thickness direction at a location where the connecting flow field is disposed is less than an angle on both sides of the convex shape of the bead seal with respect to the plane at other locations of the bead seal.

In the above-described metallic separator for a fuel cell, a height of the convex shape of the bead seal at the location where the connecting flow field is disposed preferably is equal to a height of the convex shape of the bead seal at the other locations thereof.

In the above-described metallic separator for a fuel cell, at the location where the connecting flow field is disposed, angles of one side wall and another side wall of the convex shape of the bead seal with respect to a plane perpendicular to the thickness direction preferably are equal.

In accordance with the fuel cell and the metallic separator for a fuel cell of the present invention, the width of the root portion of the bead seal is greater at the location where the connecting flow field is formed than at other locations thereof. Therefore, variances that occur in the surface pressure between regions where the connecting flow fields are provided in the bead seals and other regions thereof can be reduced to a small amount.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
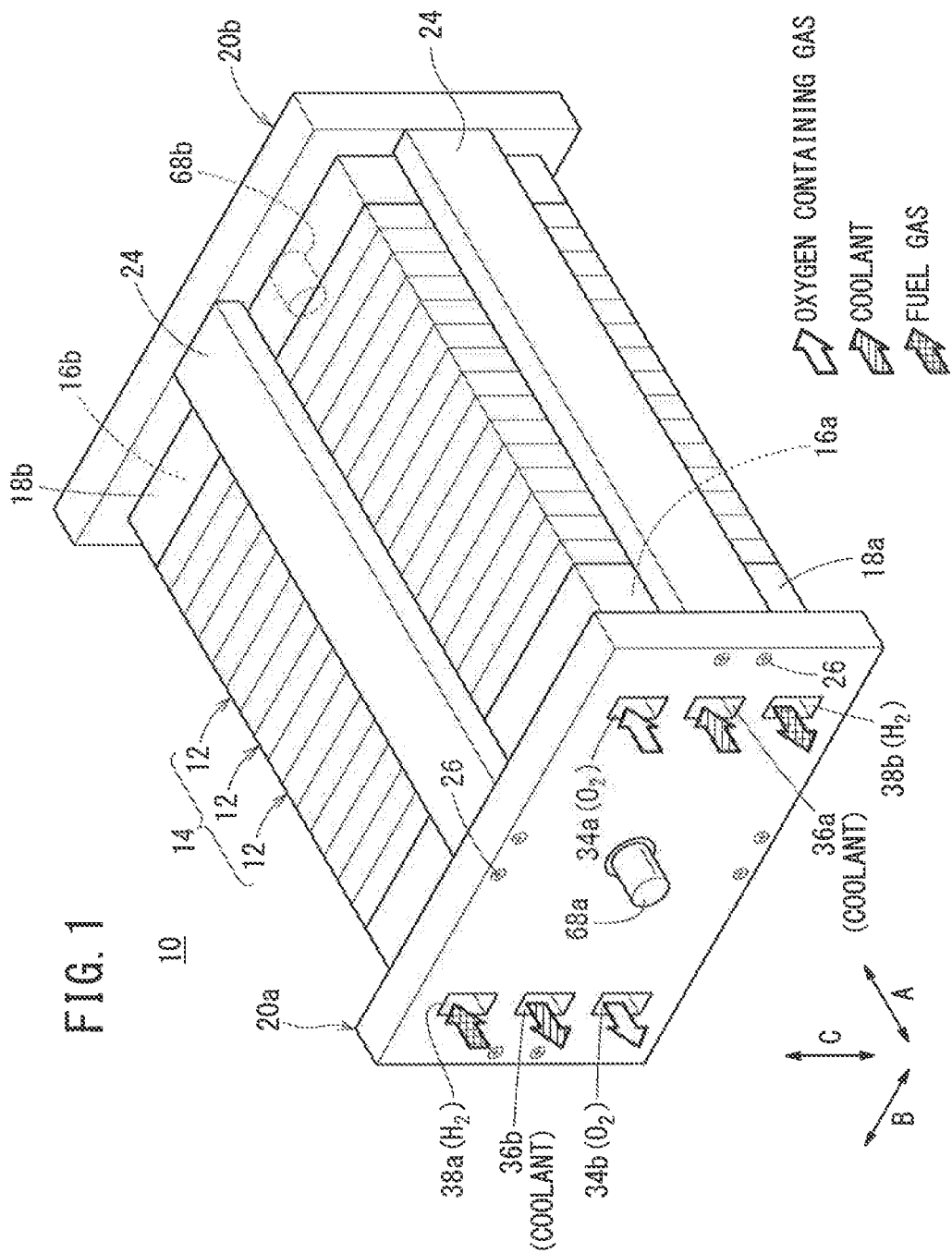
FIG. 1 is an explanatory perspective view of a fuel cell stack.
Figure 2:
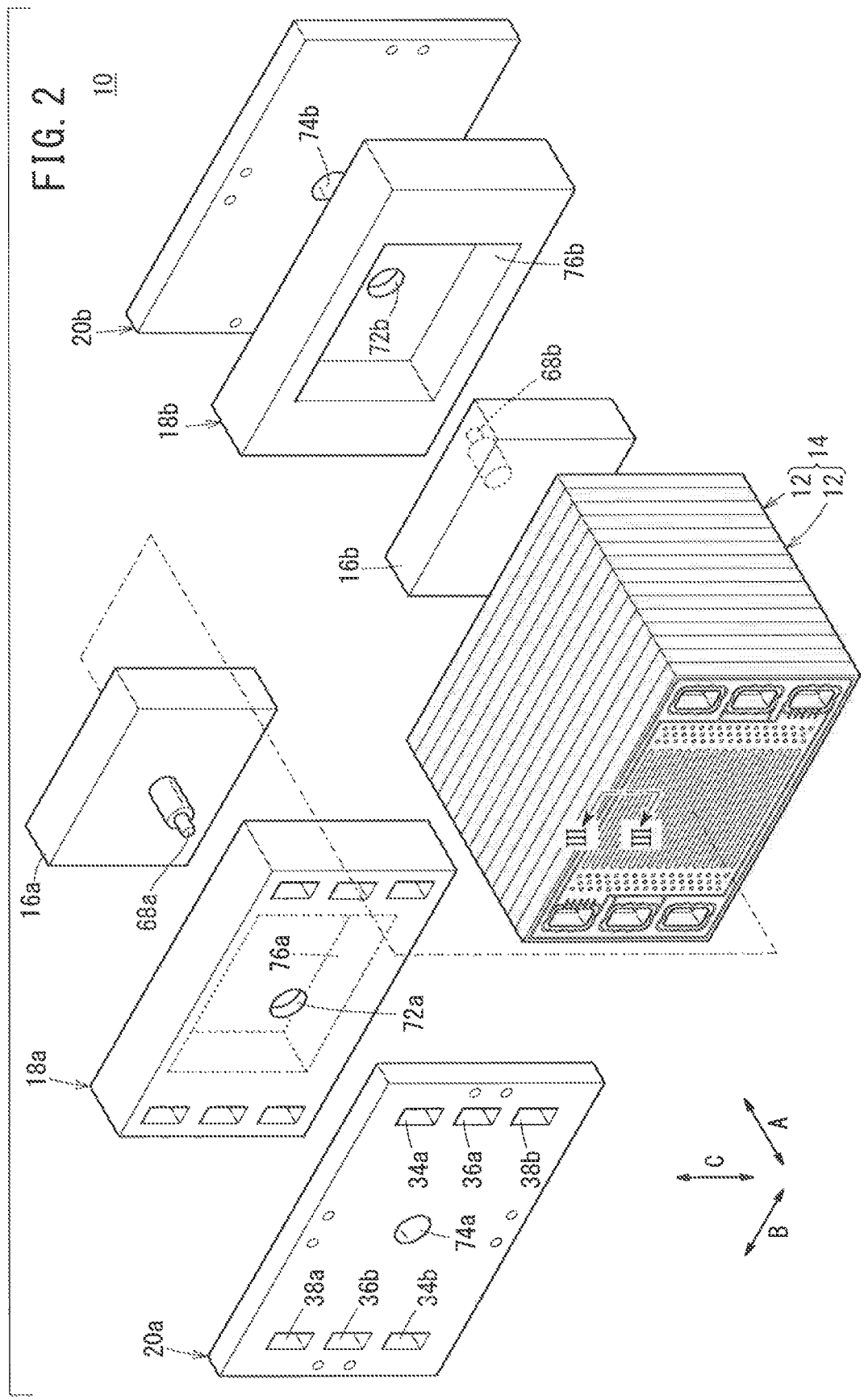
FIG. 2 is a partially exploded schematic perspective view of the fuel cell stack.

As shown in FIGS. 1 and 2, a fuel cell stack 10 comprises a stacked body 14 in which a plurality of power generation cells (fuel cells) 12 are stacked together in a horizontal direction (the direction of the arrow A) or in a direction of gravity (the direction of the arrow C). The fuel cell stack 10, for example, is mounted in a fuel cell vehicle such as a fuel cell electric automobile (not shown).

A terminal plate 16a, an insulator 18a, and an end plate 20a are arranged in this order sequentially toward the outside on one end in the stacking direction (the direction of the arrow A) of the stacked body 14 (see FIG. 2). A terminal plate 16b, an insulator 18b, and an end plate 20b are arranged in this order sequentially toward the outside on the other end in the stacking direction of the stacked body 14.

As shown in FIG. 1, the end plates 20a, 20b have horizontally elongate shapes (they may also have vertically elongate shapes), together with coupling bars 24 being arranged between respective sides of the end plates 20a, 20b. Both ends of the respective coupling bars 24 are fixed by bolts 26 to inner surfaces of the end plates 20a, 20b, so as to apply a tightening load to the plural stacked power generation cells 12 in the stacking direction as indicated by the arrow A. The fuel cell stack 10 may be equipped with a casing in which the end plates 20a, 20b are provided as end plates thereof, and a structure may be provided in which the stacked body 14 is accommodated inside such a casing.

Figure 3:
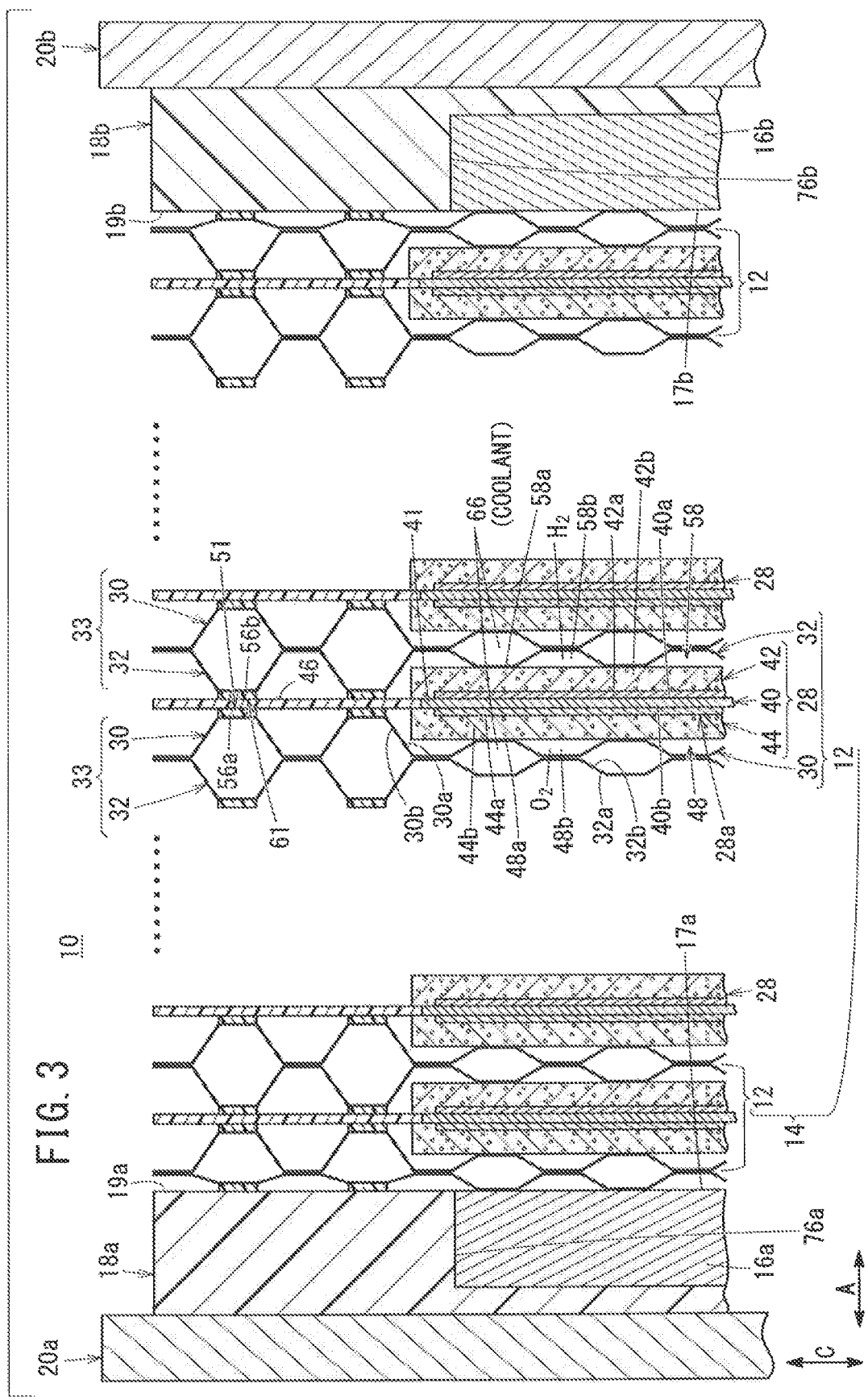
FIG. 3 is a cross-sectional view taken along line III-III in FIG. 2 of the fuel cell stack.
Figure 4:
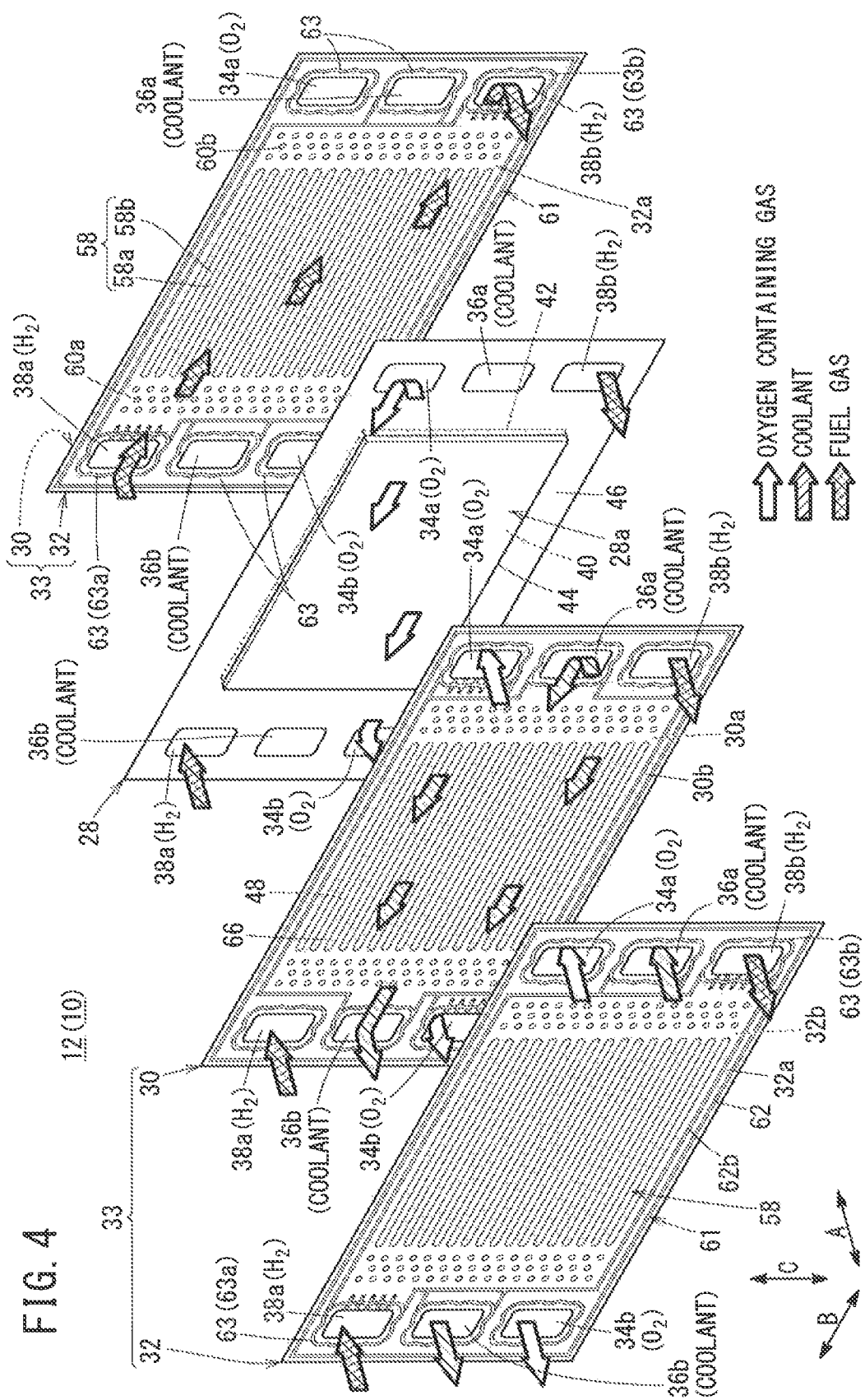
FIG. 4 is an explanatory exploded perspective view showing a power generation cell of the fuel cell stack.

As shown in FIGS. 3 and 4, the power generation cell 12 is formed by sandwiching a resin film equipped MEA 28 between a first metallic separator 30 and a second metallic separator 32. The first metallic separator 30 and the second metallic separator 32, for example, are made of metal plates such as steel plates, stainless steel plates, aluminum plates, plated steel sheets, or metal plates having anti-corrosive surfaces produced by performing a surface treatment. The first metallic separator 30 and the second metallic separator 32 are formed with cross section being in wavy shapes by press forming. The first metallic separator 30 and the second metallic separator 32 are joined together integrally by welding, brazing, or crimping the outer peripheries thereof to thereby constitute a bonded separator 33.

At one end of the fuel cell 12 (one end in the horizontal direction in FIG. 4) as indicated by the arrow B which is the longitudinal direction of the fuel cell 12, an oxygen containing gas supply passage 34a, a coolant supply passage 36a, and a fuel gas discharge passage 38b are provided. The oxygen containing gas supply passage 34a, the coolant supply passage 36a, and the fuel gas discharge passage 38b communicate mutually in the direction of the arrow A. The oxygen containing gas supply passage 34a, the coolant supply passage 36a, and the fuel gas discharge passage 38b are arranged sequentially in a vertical direction as indicated by the arrow C. An oxygen containing gas is supplied through the oxygen containing gas supply passage 34a. The coolant is supplied through the coolant supply passage 36a, and a fuel gas such as a hydrogen containing gas is discharged through the fuel gas discharge passage 38b.

At the other end of the power generation cell 12 in the direction of the arrow B, a fuel gas supply passage 38a, a coolant discharge passage 36b, and an oxygen containing gas discharge passage 34b are provided. The fuel gas supply passage 38a, the coolant discharge passage 36b, and the oxygen containing gas discharge passage 34b communicate mutually in the direction of the arrow A, and are arranged sequentially in the direction of the arrow C. The fuel gas is supplied through the fuel gas supply passage 38a, the coolant is discharged through the coolant discharge passage 36b, and the oxygen containing gas is discharged through the oxygen containing gas discharge passage 34b. The arrangement of the oxygen containing gas supply passage 34a and the oxygen containing gas discharge passage 34b, as well as the fuel gas supply passage 38a and the fuel gas discharge passage 38b is not limited to that shown for the present embodiment. Depending on required specifications, the arrangement may be set appropriately.

As shown in FIG. 3, the resin film equipped MEA 28 including a resin film 46 having a frame-like shape on the outer periphery thereon comprises the membrane electrode assembly 28a, and the resin film 46 provided on an outer peripheral portion of the membrane electrode assembly 28a. The membrane electrode assembly 28a includes an electrolyte membrane 40, and an anode 42 and a cathode 44 sandwiching the electrolyte membrane 40 therebetween.

The electrolyte membrane 40 is, for example, a solid polymer electrolyte membrane (cation ion exchange membrane). The solid polymer electrolyte membrane is formed by impregnating a thin membrane of perfluorosulfonic acid with water, for example. The electrolyte membrane 40 is sandwiched between the anode 20 and the cathode 22. A fluorine based electrolyte may be used as the electrolyte membrane 40. Alternatively, an HC (hydrocarbon) based electrolyte may be used as the electrolyte membrane 40. The electrolyte membrane 40 has a smaller planar dimension (external dimension) than the anode 42 and the cathode 44.

A resin film 46 in the shape of a frame is sandwiched between an outer peripheral edge portion of the anode 20 and an outer peripheral edge portion of the cathode 22. An inner peripheral edge surface of the resin film 46 is in close proximity to, overlaps or abuts against an outer peripheral edge surface of the electrolyte membrane 40. As shown in FIG. 4, at one end edge portion of the resin film 46 in the direction of the arrow B, an oxygen containing gas supply passage 34a, a coolant supply passage 36a, and a fuel gas discharge passage 38b are provided. At another end edge portion of the resin film 46 in the direction of the arrow B, a fuel gas supply passage 38a, a coolant discharge passage 36b, and an oxygen containing gas discharge passage 34b are provided.

For example, the resin film 46 is made of PPS (polyphenylene sulfide), PPA (polyphthalamide), PEN (polyethylene naphthalate), PES (polyethersulfone), LCP (liquid crystal polymer), PVDF (polyvinylidene fluoride), silicone resin, fluororesin, m-PPE (modified polyphenylene ether resin), PET (polyethylene terephthalate), PBT (polybutylene terephthalate), or modified polyolefin. The electrolyte membrane 40 may be formed to project outwardly without using the resin film 46. Further, a frame-shaped film may be disposed on both sides of the outwardly projecting electrolyte membrane 40.

Figure 5:
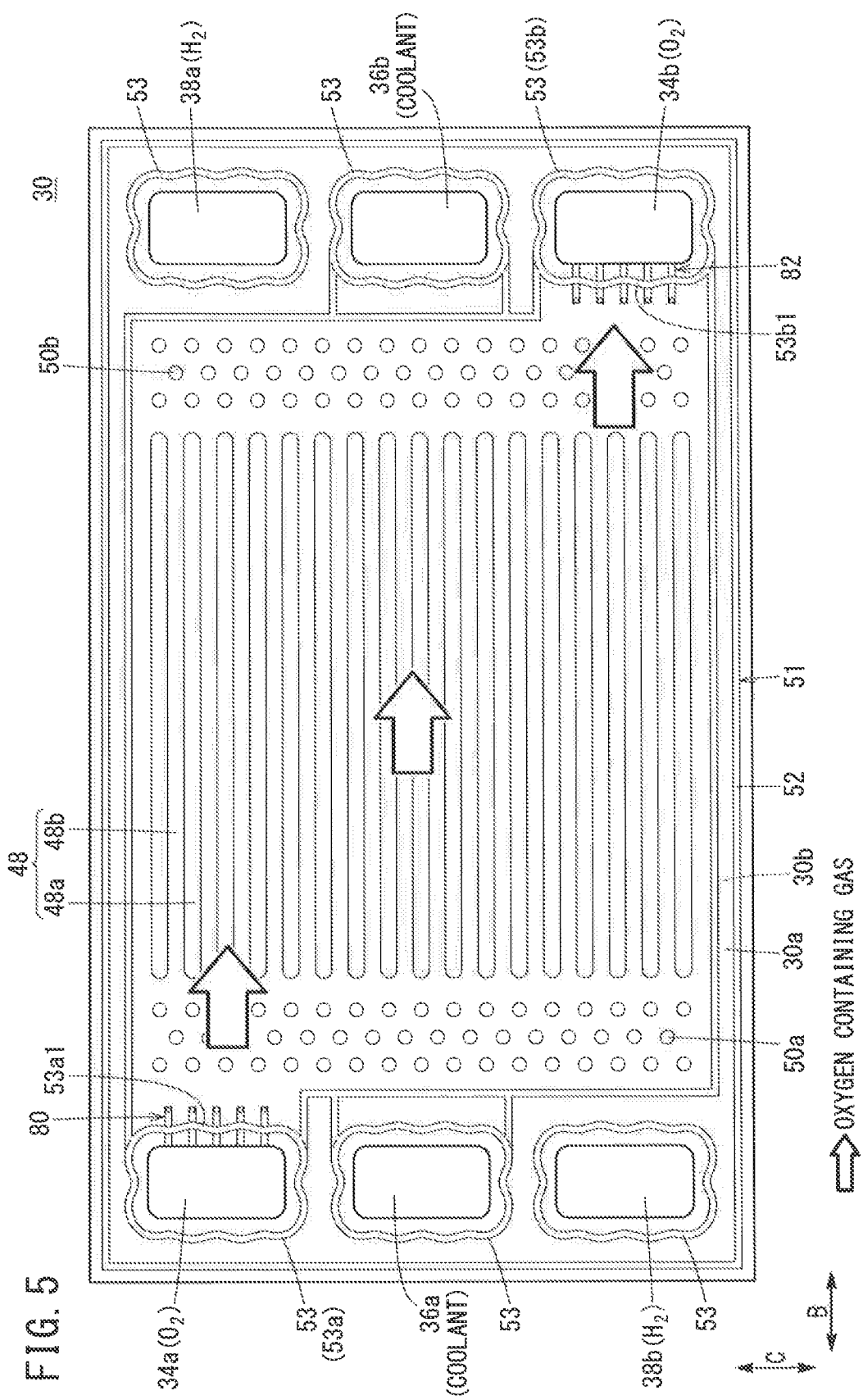
FIG. 5 is an explanatory front view of a first metallic separator.

As shown in FIG. 4, an oxygen containing gas flow field 48 extending in the direction of the arrow B, for example, is disposed on a surface 30a (referred to hereinafter as a "front surface 30a") of the first metallic separator 30 facing toward the resin film equipped MEA 28. As shown in FIG. 5, the oxygen containing gas flow field 48 communicates fluidically with the oxygen containing gas supply passage 34a and the oxygen containing gas discharge passage 34b. The oxygen containing gas flow field 48 includes straight flow grooves 48b disposed between a plurality of projections 48a that extend in the direction of the arrow B. Instead of such a plurality of straight flow grooves 48b, a plurality of wavy flow grooves may be provided.

On the front surface 30a of the first metallic separator 30, an inlet buffer 50a having a plurality of embossed portions is disposed between the oxygen containing gas supply passage 34a and the oxygen containing gas flow field 48. Further, on the front surface 30a of the first metallic separator 30, an outlet buffer 50b having a plurality of embossed portions is disposed between the oxygen containing gas discharge passage 34b and the oxygen containing gas flow field 48.

A first seal line (metal bead seal) 51 which is formed by press forming is formed to project or bulge out toward the resin film equipped MEA 28 on the front surface 30a of the first metallic separator 30. The first seal line 51 includes an outside bead portion 52 and a plurality of communication passage bead sections (bead seals) 53. The outside bead portion 52 surrounds an outer peripheral edge portion of the front surface 30a, together with projecting outwardly from the front surface 30a of the first metallic separator 30 toward the MEA 28.

As shown in FIG. 3, on a projecting end surface of the first seal line 51, resin members 56a are fixed and attached thereto by printing or coating, etc. Polyester fibers, for example, may be used for the resin members 56a. The resin members 56a may be provided on the resin film 46. The resin members 56a are not essential components and thus may be excluded.

As shown in FIG. 5, the plurality of communication passage bead sections 53 project out from the front surface 30a of the first metallic separator 30 toward the MEA 28, together with separately surrounding, respectively, the oxygen containing gas supply passage 34a, the oxygen containing gas discharge passage 34b, the fuel gas supply passage 38a, the fuel gas discharge passage 38b, the coolant supply passage 36a, and the coolant discharge passage 36b.

The communication passage bead sections 53 have wavy shapes. More specifically, regions along the long sides of the respective passages 34a, 34b, 36a, 36b, 38a, 38b (regions parallel with the long sides thereof) within the communication passage bead sections 53 are formed with wavy shapes as viewed in plan. The regions along the long sides of the respective passages 34a, 34b, 36a, 36b, 38a, 38b within the communication passage bead sections 53 may also be formed with straight shapes as viewed in plan.

As shown in FIG. 5, on the first metallic separator 30, bridge sections (connecting flow fields) 80, 82 are provided, which enable communication between inner sides (on the side of the passages 34a, 34b) and outer sides (on the side of the oxygen containing gas flow field 48) of the communication passage bead sections 53a, 53b that surround the oxygen containing gas supply passage 34a and the oxygen containing gas discharge passage 34b, respectively.

Within the communication passage bead section 53a, plural bridge sections 80, which are separated at given intervals, are disposed at a region (hereinafter referred to as a "gas flow field side bead 53a1") along one long side of the oxygen containing gas supply passage 34a on the side of the oxygen containing gas flow field 48. Within the communication passage bead section 53b, plural bridge sections 82, which are separated at given intervals, are disposed at a region (hereinafter referred to as a "gas flow field side bead 53b1") along one long side of the oxygen containing gas discharge passage 34b on the side of the oxygen containing gas flow field 48.

The communication passage bead section 53a and the communication passage bead section 53b are constituted in the same manner. Further, the bridge section 80 on the side of the oxygen containing gas supply passage 34a and the bridge section 82 on the side of the oxygen containing gas discharge passage 34b are constituted in the same manner. Therefore, hereinafter, a detailed description will be made representatively concerning the structures of the communication passage bead section 53a and the bridge section 80, whereas a detailed description in relation to the structures of the communication passage bead section 53b and the bridge section 82 will be omitted.

Figure 6:
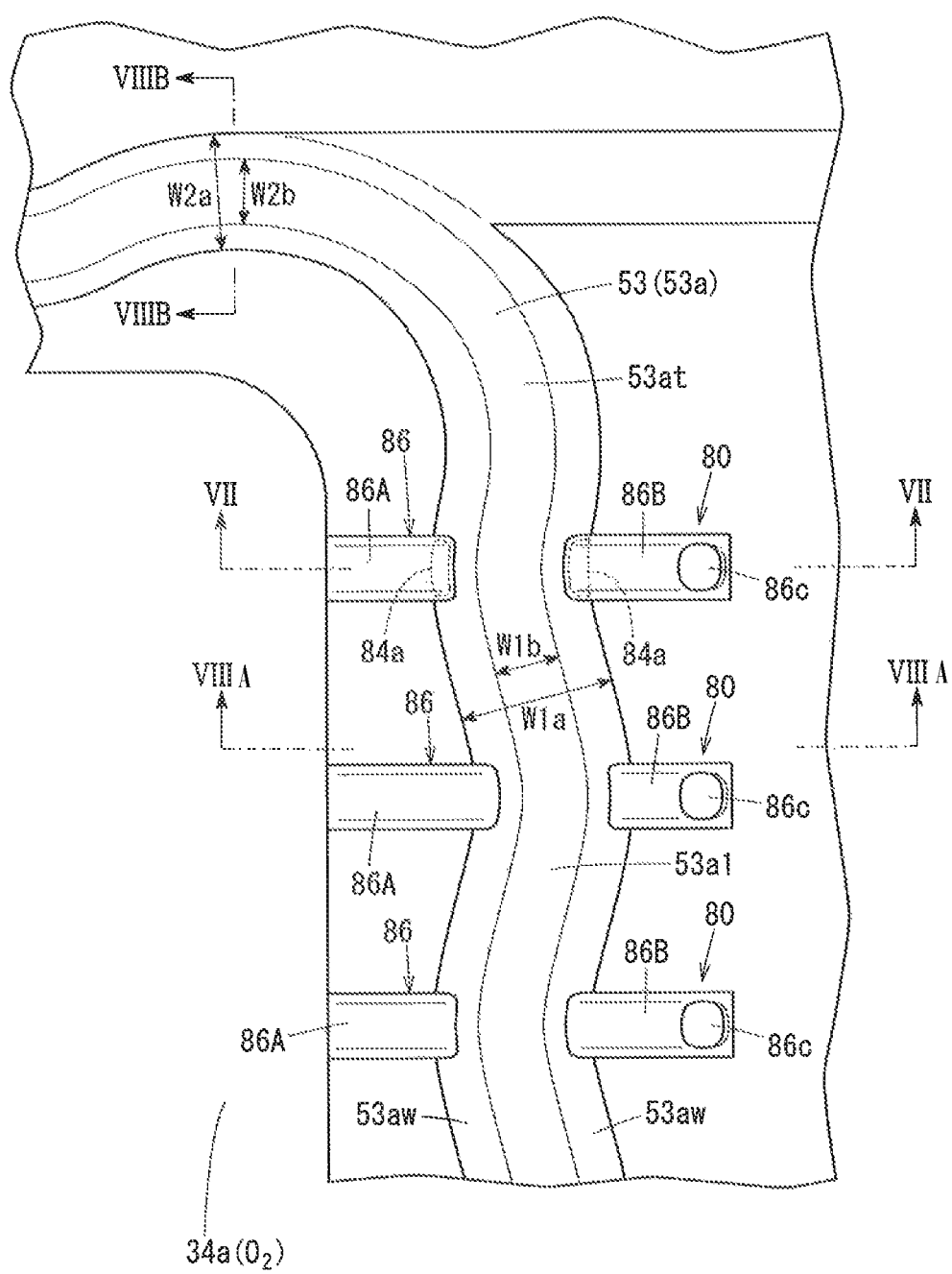
FIG. 6 is an explanatory view of essential parts of a bead seal surrounding an oxygen containing gas supply passage in a first metallic separator.

As shown in FIG. 6, the bridge section 80 is provided with respective apex parts (central portions in the direction in which the respective arcuately shaped curved portions extend) of a plurality of arcuate curved portions that make up the wavy shape of the communication passage bead section 53a. Further, as shown in FIGS. 6 and 7, the bridge section 80 includes through holes 84a, 84b disposed on both sides (side walls 53aw) of the convex shape of the communication passage bead section 53a, and tunnels 86 connected to the through holes 84a, 84b.

Figure 7:
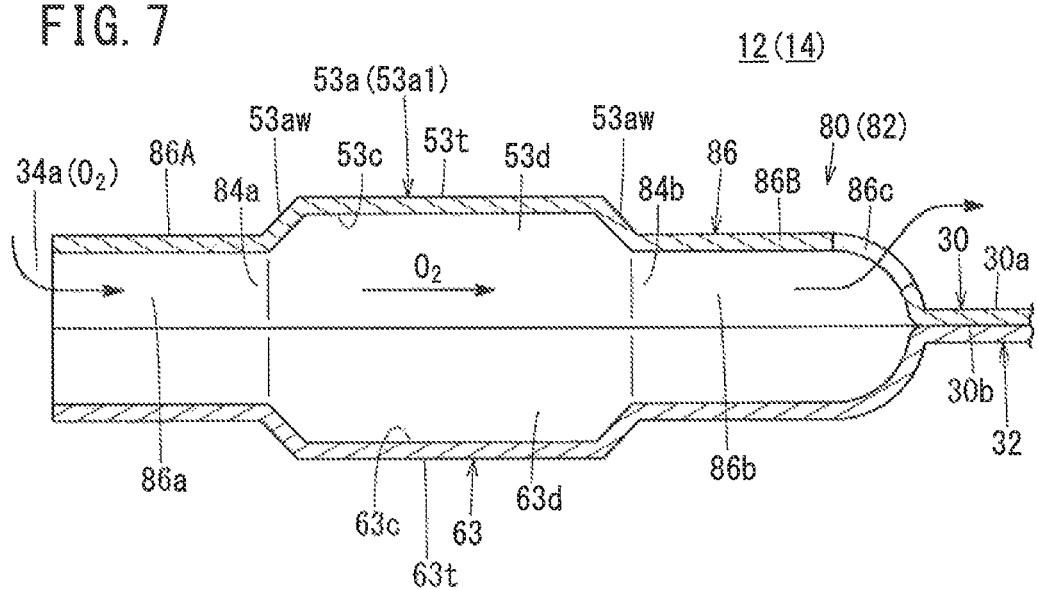
FIG. 7 is a cross-sectional view taken along line VII-VII of FIG. 6.

As shown in FIG. 7, a recessed part 53c, which forms a back side shape of the convexly shaped communication passage bead section 53a, is provided on the first metallic separator 30. The recessed part 53c makes up an interior space 53d of the communication passage bead section 53a. The through holes 84a, 84b communicate between the exterior and the interior space 53d of the communication passage bead section 53a. The recessed part 53c of the first metallic separator 30 is disposed in confronting relation to a recessed part 63c that forms a back side shape of the communication passage bead section 63 of the second metallic separator 32. Accordingly, the interior space 53d of the communication passage bead section 53a of the first metallic separator 30 communicates with the interior space 63d of the communication passage bead section 63 of the second metallic separator 32.

FIG. 7 illustrates cross sections of the first metallic separator 30 and the second metallic separator 32 in an assembled condition as the fuel cell stack 10 (i.e., a condition in which a fastening load in the stacking direction is applied to the stacked body 14, and a surface pressure due to the fastening load acts on the communication passage bead sections 53a, 63). The shapes of projecting distal end sections 53t, 63t of the communication passage bead sections 53a, 63 may be curved shapes that bulge outwardly in directions in which the communication passage bead sections 53a, 63 project prior to assembly thereof (i.e., a state in which the aforementioned tightening load is not applied). However, as shown in FIG. 7, in an assembled state of the fuel cell stack 10, the shapes ultimately become flat shapes. The same also holds true in FIGS. 8A, 8B, and 12 as well.

The tunnels 86 are of convex shapes that project out from the front surface 30a of the first metallic separator 30 toward the MEA 28, and together therewith, include tunnel passages 86a, 86b that communicate through the through holes 84a, 84b with the interior space 53d of the communication passage bead section 63a. The tunnels 86 include a first tunnel section 86A that communicates between the interior space 53d and the oxygen containing gas supply passage 34a, and a second tunnel section 86B that communicates between the interior space 53d and the oxygen containing gas flow field 48 (see FIG. 5). The first tunnel section 86A and the second tunnel section 86B project out in mutually opposite directions from the communication passage bead section 53a along the plane of the first metallic separator 30.

Openings 86c that penetrate through the interior and exterior of the second tunnel section 86B are disposed in the second tunnel section 86B, on end parts thereof on an opposite side from the location where the openings 86c are connected with the communication passage bead section 53a.

As shown in FIG. 6, at a location where the bridge sections 80 of the communication passage bead section 53a are disposed, the width W1a (see FIG. 8A) of the root section of the communication passage bead section 53a is greater than the width W2a (see FIG. 8B) of the root section of the communication passage bead section 53a at other locations (regions where the bridge sections 80 are not provided) thereof. In this instance, the locations where the bridge sections 80 of the communication passage bead section 53a are provided include those locations where the bridge sections 80 are connected to the communication passage bead section 53a and a neighborhood of the locations.

According to a first embodiment, within the communication passage bead section 53a, the width of the root section at locations between the mutually adjacent bridge sections 80 spans over the entire length between the bridge sections 80, and is set to the aforementioned width W1a, which is greater than the width W2a at the aforementioned other locations. Further, within the communication passage bead section 53a, the width of the root section at locations adjacent to the side of the aforementioned other locations of the bridge sections 80 on both ends of the plurality of bridge sections 80 also is set to the aforementioned width W1a, which is greater than the width W2a at the aforementioned other locations.

As shown in FIG. 6, at locations where the bridge sections 80 are disposed, the width W1b of the projecting distal end section 53t (see FIG. 8A), which forms an apex of the communication passage bead section 53a, is the same as the width W2b (see FIG. 8B) of the projecting distal end section 53t of the communication passage bead section 53a at other locations thereof.

At locations where the bridge sections 80 are disposed, the height h1 (see FIG. 8A) of the convex shape of the communication passage bead section 53a is the same as the height h2 (see FIG. 8B) of the convex shape of the communication passage bead section 53a at the other locations thereof.

The communication passage bead section 53a has a tapering shape that tapers toward the side of the projecting distal end section 53t, and side walls 53aw on both sides thereof are inclined with respect to a surface perpendicular to the thickness direction of the first metallic separator 30.

Figure 8A:
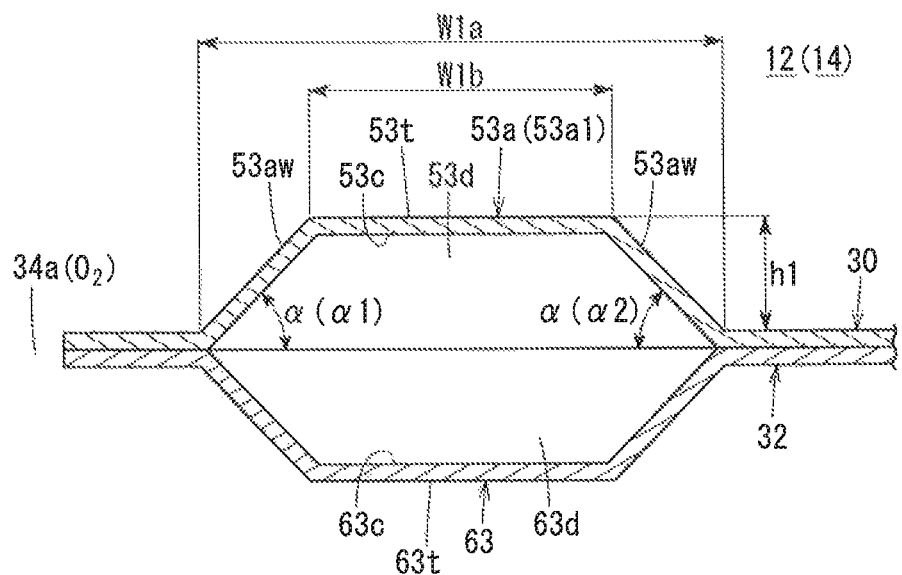
FIG. 8A is a cross-sectional view taken along line VIIIA-VIIIA in FIG. 6.

At locations where the bridge sections 80 are disposed, angles α (angles with respect to a plane perpendicular to the thickness direction) (see FIG. 8A) on both sides (side walls 53aw) of the convex shape of the communication passage bead section 53a are smaller than the angles β (see FIG. 8B) of the convex shape of the communication passage bead section 53a at other locations thereof. As shown in FIG. 8A, at the locations where the bridge sections 80 are disposed, an angle α1 of one side wall 53aw of the convex shape of the communication passage bead section 53a, and an angle α2 of the other side wall 53aw thereof are equal.

As shown in FIG. 4, a fuel gas flow field 58 extending in the direction of the arrow B, for example, is disposed on a surface 32a (referred to hereinafter as a "front surface 32a") of the second metallic separator 32 facing toward the resin film equipped MEA 28. The fuel gas flow field 58 communicates fluidically with the fuel gas supply passage 38a and the fuel gas discharge passage 38b. The fuel gas flow field 58 includes straight flow grooves 58b disposed between a plurality of projections 58a that extend in the direction of the arrow B. Instead of such a plurality of straight flow grooves 58b, a plurality of wavy flow grooves may be provided.

On the front surface 32a of the second metallic separator 32, an inlet buffer 60a having a plurality of embossed portions is disposed between the fuel gas supply passage 38a and the fuel gas flow field 58. Further, on the front surface 32a of the second metallic separator 32, an outlet buffer 60b having a plurality of embossed portions is disposed between the fuel gas discharge passage 38b and the fuel gas flow field 58.

A second seal line (metal bead seal) 61 which is formed by press forming is formed to project or bulge out toward the resin film equipped MEA 28 on the front surface 32a of the second metallic separator 32. The second seal line 61 includes an outside bead portion 62 and a plurality of communication passage bead sections (bead seals) 63. The outside bead portion 62 goes around along an outer peripheral edge portion of the front surface 32a, together with projecting outwardly from the front surface 32a of the second metallic separator 32.

As shown in FIG. 3, on a projecting end surface of the first seal line 51, resin members 56a are fixed and attached thereto by printing or coating, etc. Polyester fibers, for example, may be used for the resin members 56a. The resin members 56a may be provided on the resin film 46. The resin members 56a are not essential components and thus may be excluded.

Figure 9:
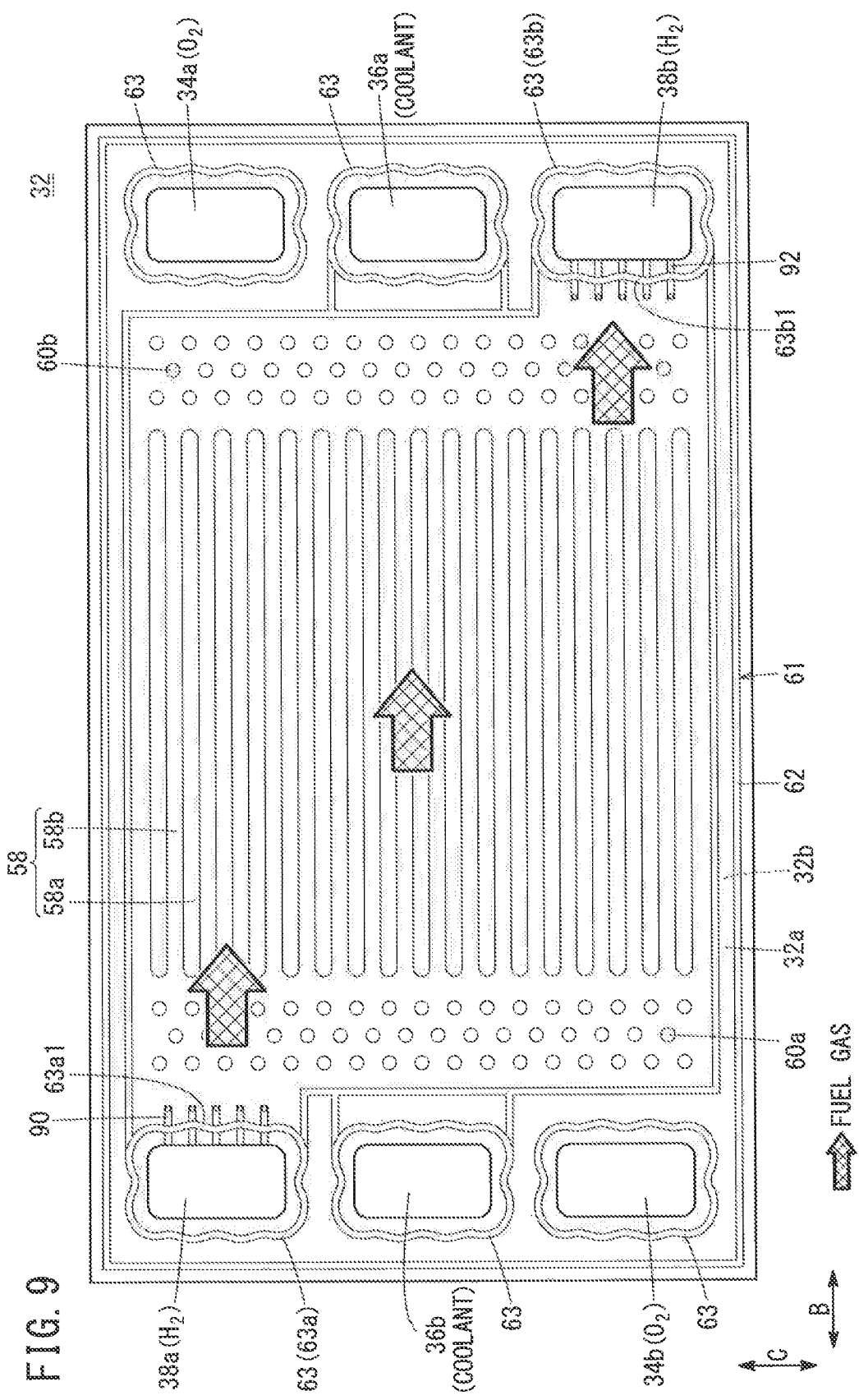
FIG. 9 is an explanatory front view of a second metallic separator.

As shown in FIG. 9, the plurality of communication passage bead sections 63 project out from the front surface 32a of the second metallic separator 32, together with separately surrounding, respectively, the oxygen containing gas supply passage 34a, the oxygen containing gas discharge passage 34b, the fuel gas supply passage 38a, the fuel gas discharge passage 38b, the coolant supply passage 36a, and the coolant discharge passage 36b.

The communication passage bead sections 63 have wavy shapes. More specifically, regions along the long sides of the respective passages 34a, 34b, 36a, 36b, 38a, 38b (regions parallel with the long sides thereof) within the communication passage bead sections 63 are formed with wavy shapes as viewed in plan. The regions along the long sides of the respective passages 34a, 34b, 36a, 36b, 38a, 38b within the communication passage bead sections 63 may also be formed with straight shapes as viewed in plan.

On the second metallic separator 32, bridge sections (connecting flow fields) 90, 92 are provided, which enable communication between inner sides (on the side of the passages 38a, 38b) and outer sides (on the side of the fuel gas flow field 58) of the communication passage bead sections 63a, 63b that surround the fuel gas supply passage 38a and the fuel gas discharge passage 38b, respectively.

Within the communication passage bead section 63a, plural bridge sections 90, which are separated at given intervals, are disposed at a region (hereinafter referred to as a "gas flow field side bead 63a1") along one long side of the fuel gas supply passage 38a on the side of the fuel gas flow field 58. Within the communication passage bead section 63b, plural bridge sections 92, which are separated at given intervals, are disposed at a region (hereinafter referred to as a "gas flow field side bead 63b1") along one long side of the fuel gas discharge passage 38b on the side of the fuel gas flow field 58.

The bridge sections 90, 92 provided on the second metallic separator 32 are constituted in the same manner as the aforementioned bridge sections 80, 82 provided on the first metallic separator 30 (see FIGS. 6 through 8B). The communication passage bead sections 63a, 63b are constituted in the same manner as the aforementioned communication passage bead sections 53a, 53b. Accordingly, concerning the shape (width, height, angles) of the communication passage bead section 63a, the mutual size relationships between the regions where the bridge sections 90 are provided and the other regions thereof are the same as those of the communication passage bead section 53a of the first metallic separator 30. Further, concerning the shape (width, height, angles) of the communication passage bead section 63b, the mutual size relationships between the regions where the bridge sections 92 are provided and the other regions thereof are the same as those of the communication passage bead section 53b of the first metallic separator 30.

As shown in FIGS. 3 and 4, a coolant flow field 66 is formed between a surface 30b of the first metallic separator 30 and a surface 32b of the second metallic separator 32 with the surfaces being bonded. The coolant flow field 66 is connected to and communicates fluidically with the coolant supply passage 36a and the coolant discharge passage 36b. The coolant flow field 66 is formed by stacking and matching together the back surface shape of the first metallic separator 30 on which the oxygen containing gas flow field 48 is formed, and the back surface shape of the second metallic separator 32 on which the fuel gas flow field 58 is formed. The first metallic separator 30 and the second metallic separator 32 are joined by welding peripheries and around the passages. Instead of welding, the separators may be joined by brazing.

As shown in FIG. 2, the terminal plates 16a, 16b are made from a material possessing electrical conductivity, for example, a metal such as copper, aluminum, or stainless steel, etc. Roughly in the centers of each of the terminal plates 16a, 16b, terminals 68a, 68b are provided that extend outwardly in the stacking direction.

The insulators 18a, 18b are formed by an insulating material, for example, a polycarbonate (PC) or phenol resin or the like. Substantially in the centers of each of the insulators 18a, 18b, recesses 76a, 76b are formed that open in directions toward the stacked body 14, and openings 72a, 72b are disposed on the bottom surface of the recesses 76a, 76b.

At one end edge portions of the insulator 18a and the end plate 20a in the direction of the arrow B, an oxygen containing gas supply passage 34a, a coolant supply passage 36a, and a fuel gas discharge passage 38b are provided. At other end edge portions of the insulator 18a and the end plate 20a in the direction of the arrow B, a fuel gas supply passage 38a, a coolant discharge passage 36b, and an oxygen containing gas discharge passage 34b are provided.

As shown in FIGS. 2 and 3, the terminal plate 16a is accommodated in the recess 76a of the insulator 18a, whereas the terminal plate 16b is accommodated in the recess 76b of the insulator 18b.

As shown in FIG. 1, the coupling bars 24 are arranged between respective sides of the end plates 20a, 20b. Both ends of the respective coupling bars 24 are fixed through bolts 26 to the inner surfaces of the end plates 20a, 20b, and a tightening load is applied to the stacked body 14 in the stacking direction, whereby the fuel cell stack 10 is assembled.

Operations of the fuel cell stack 10, which is constructed in the foregoing manner, will be described.

First, as shown in FIG. 1, an oxygen containing gas, for example, air, is supplied to the oxygen containing gas supply passage 34a of the end plate 20a. A fuel gas such as a hydrogen containing gas or the like is supplied to the fuel gas supply passage 38a of the end plate 20a. Further, a coolant such as pure water, ethylene glycol, or oil is supplied to the coolant supply passage 36a of the end plate 20a.

As shown in FIG. 4, the oxygen containing gas flows from the oxygen containing gas supply passage 34a and via the bridge section 80 (see FIG. 5) into the oxygen containing gas flow field 48 of the first metallic separator 30. At this time, as shown in FIG. 7, the oxygen containing gas flows in first from the oxygen containing gas supply passage 34a to the rear surface 30b side of the first metallic separator 30 (between the first metallic separator 30 and the second metallic separator 32), and having passed through the interiors of the tunnels 86 (tunnel passages 86a, 86b) and the interior (interior space 53d) of the communication passage bead section 53a, flows out from openings 86d to the front surface 30a side of the first metallic separator 30. In addition as shown in FIG. 4, the oxygen containing gas flows along the oxygen containing gas flow field 48 in the direction of the arrow B, and the oxygen containing gas is supplied to the cathode 44 of the membrane electrode assembly 28a.

Meanwhile, the fuel gas flows from the fuel gas supply passage 38a and via the bridge section 90 (see FIG. 9) into the fuel gas flow field 58 of the second metallic separator 32. The fuel gas moves along the fuel gas flow field 58 toward the direction of the arrow B, and the fuel gas is supplied to the anode 42 of the membrane electrode assembly 28a, thereby inducing an electrochemical reaction at the anode 42.

Consequently, in each of the membrane electrode assemblies 28a, the oxygen containing gas, which is supplied to the cathode 44, and the fuel gas, which is supplied to the anode 42, are partially consumed in electrochemical reactions that take place in the second electrode catalyst layer 44a and the first electrode catalyst layer 42a, thereby generating electricity.

Next, the oxygen containing gas, which is supplied to and partially consumed at the cathode 44, flows from the oxygen containing gas flow field, through the bridge sections 82, and to the oxygen containing gas discharge passage 34b, and the oxygen containing gas is discharged in the direction of the arrow A along the oxygen containing gas discharge passage 34b. In the same way, the fuel gas, which is supplied to and partially consumed at the anode 42, flows from the fuel gas flow field 58, through the bridge sections 92, and to the fuel gas discharge passage 38b, and the fuel gas is discharged in the direction of the arrow A along the fuel gas discharge passage 38b.

Further, the coolant that is supplied to the coolant supply passage 36a flows into the coolant flow field 66 between the first metallic separator 30 and the second metallic separator 32, and thereafter, the coolant flows in the direction of the arrow B. After the coolant cools the membrane electrode assembly 28a, the coolant is discharged from the coolant discharge passage 36b.

Figure 8B:
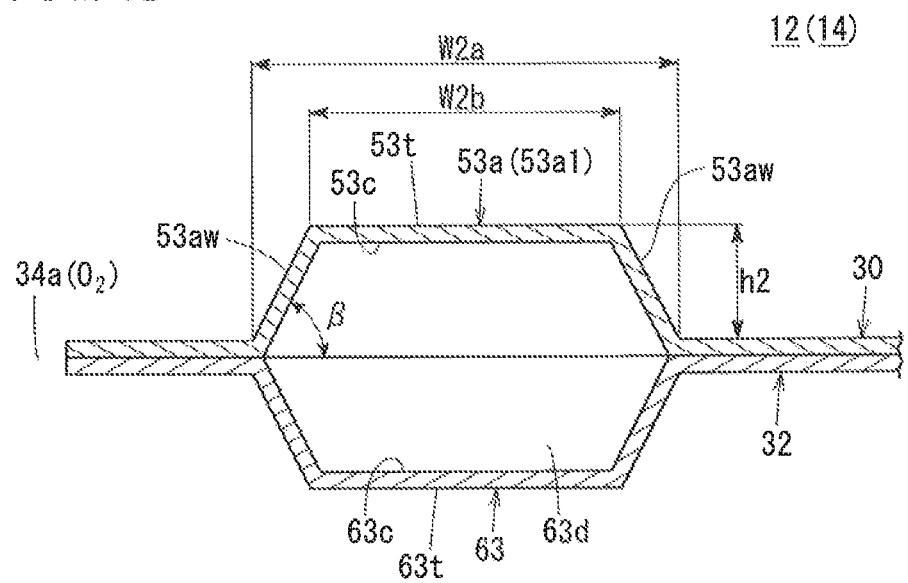
FIG. 8B is a cross-sectional view taken along line VIIIB-VIIIB in FIG. 6.

In this case, with the power generation cell 12 according to the first embodiment, as shown in FIGS. 6, 8A, and 8B, at locations where the bridge sections 80 (82, 90, 92) are disposed, the widths W1a of the root sections of the communication passage bead sections 53a (53b, 63a, 63b) is greater than the widths W2a of the root sections of the communication passage bead sections 53a (53b, 63a, 63b) at other locations thereof. Further, at locations where the bridge sections 80 (82, 90, 92) are disposed, the angles α (see FIG. 8A) on both sides of the convex shape of the communication passage bead section 53a (53b, 63a, 63b) are smaller than the angles β (see FIG. 8B) of the convex shape of the communication passage bead section 53a (53b, 63a, 63b) at other locations thereof.

Therefore, variances that occur in the surface pressure between regions where the bridge sections 80 (82, 90, 92) are provided and other regions in the communication passage bead sections 53a (53b, 63a, 63b) can be reduced to a small amount. More specifically, by setting the widths W1a of the root sections of the communication passage bead sections 53a (53b, 63a, 63b) at locations where the bridge sections 80 (82, 90, 92) are disposed to be greater than the widths W2a at other regions thereof, a rise in the surface pressure of the communication passage bead sections 53a (53b, 63a, 63b) due to the influence of the bridge sections 80 (82, 90, 92) can be suppressed. Further, by setting the angles α (see FIG. 8A) on both sides of the convex shape of the communication passage bead section 53a (53b, 63a, 63b) at locations where the bridge sections 80 (82, 90, 92) are disposed to be smaller than the angles β at other locations thereof, a rise in the surface pressure of the communication passage bead sections 53a (53b, 63a, 63b) due to the influence of the bridge sections 80 (82, 90, 92) can be suppressed. Thus, it is possible to prevent damage from occurring to the seal member, or to prevent damage from occurring to the resin film equipped MEA 28.

Figure 10:
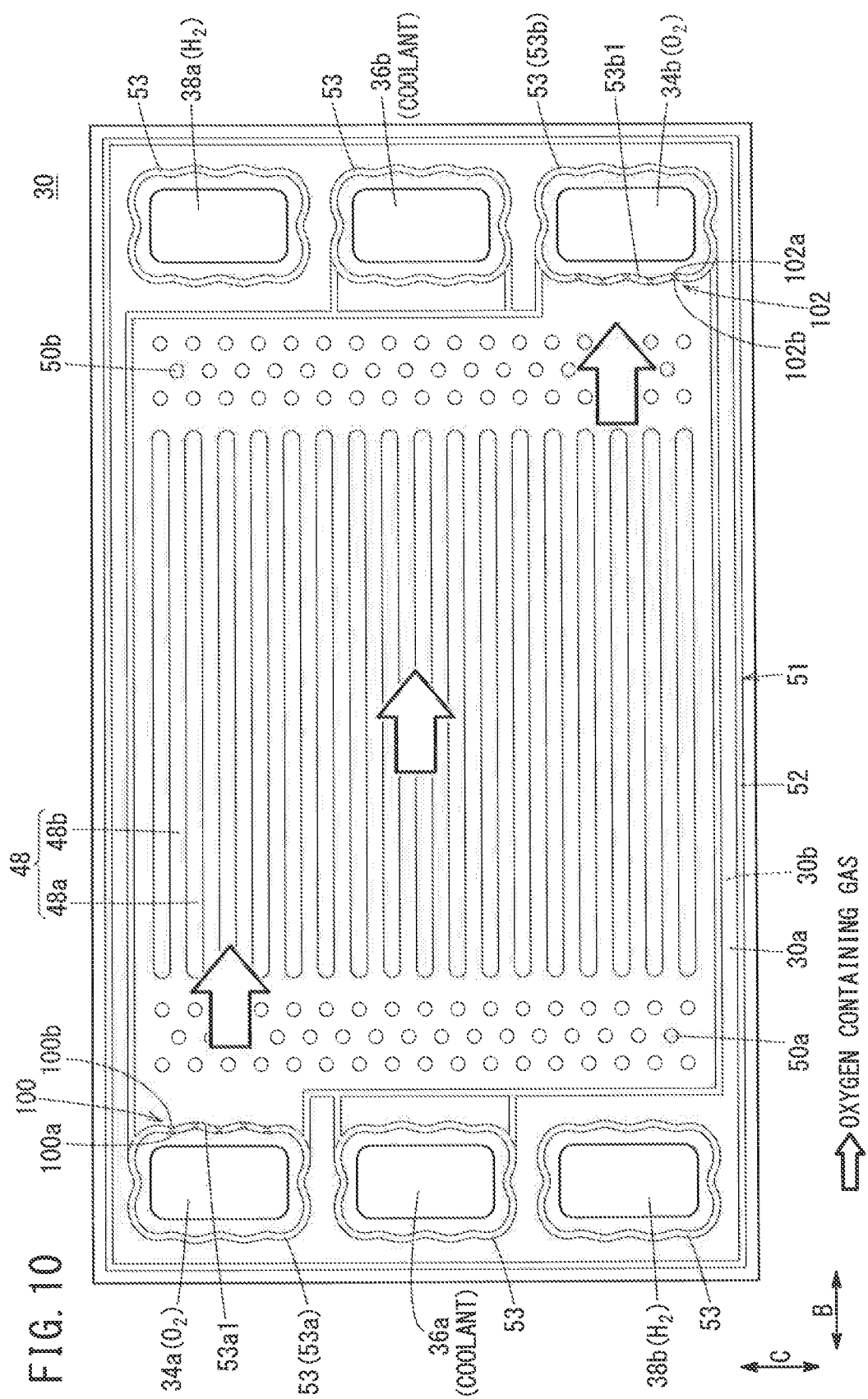
FIG. 10 is an explanatory front view of a first metallic separator in which a bridge section according to a modification is provided.

As discussed above, a configuration has been described in which the bridge sections 80 (82, 90, 92) having the tunnels 86 therein are provided. However, the present invention is not limited to this feature. As shown in FIG. 10, bridge sections 100, 102 that do not have tunnels may be provided in the first metallic separator 30, and as shown in FIG. 11, bridge sections 104, 106 that do not have tunnels may be provided in the second metallic separator 32.

As shown in FIG. 10, the bridge sections 100 are disposed in plurality at given intervals along the gas flow field side bead 53a1 of the communication passage bead section 53a. The respective bridge sections 100 include through holes 100a, 100b that communicate between the exterior and the interior space 53d (see FIG. 12) of the communication passage bead section 53a. The bridge sections 102 are disposed in plurality at given intervals along the gas flow field side bead 53b1 of the communication passage bead section 53b. The respective bridge sections 102 include through holes 102a, 102b that communicate between the exterior and the interior space of the communication passage bead section 53b.

Figure 11:
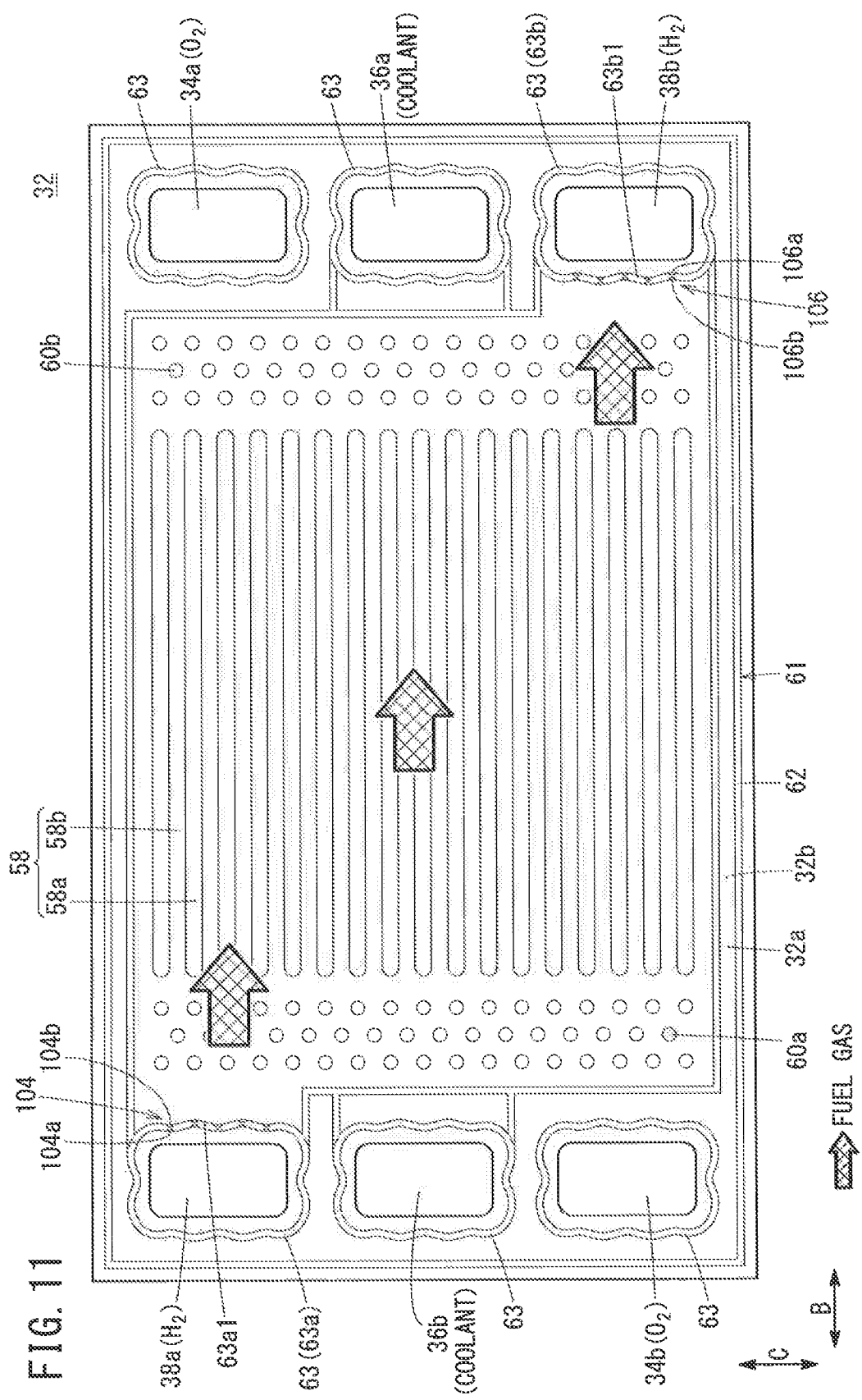
FIG. 11 is an explanatory front view of a second metallic separator in which a bridge section according to a modification is provided.

As shown in FIG. 11, bridge sections 104 are disposed in plurality at given intervals along the gas flow field side bead 63a1 of the communication passage bead section 63a. The respective bridge sections 104 include through holes 104a, 104b that communicate between the exterior and the interior space of the communication passage bead section 63a. Bridge sections 106 are disposed in plurality at given intervals along the gas flow field side bead 63b1 of the communication passage bead section 63b. The respective bridge sections 106 include through holes 106a, 106b that communicate between the exterior and the interior space of the communication passage bead section 63b.

Figure 12:
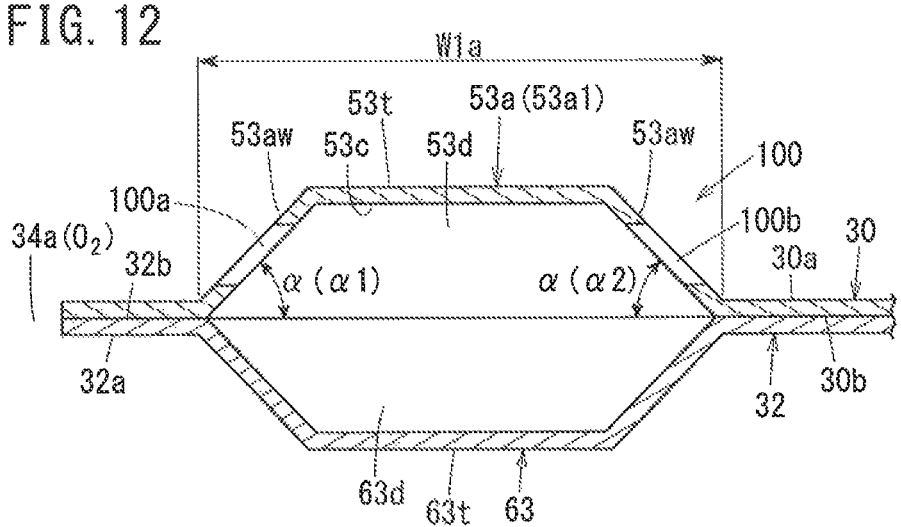
FIG. 12 is a cross-sectional view of a communication passage bead section of a region where the bridge sections according to the modification are provided.

As shown in FIG. 12, the through holes 100a, 100b penetrate through side walls 53aw on both sides of the communication passage bead section 53a that surrounds the oxygen containing gas supply passage 34a of the first metallic separator 30. Consequently, the through holes 100a, 100b communicate between the front surface 30a and the rear surface 30b of the first metallic separator 30. The through holes 102a, 102b, 104a, 104b, 106a, 106b of the other bridge sections 102, 104, 106 also are constituted in the same manner as the through holes 110a, 110b.

Other structures (arrangement positions) of the bridge sections 100, 102, 104, 106 are constituted in the same manner as those of the aforementioned bridge sections 80, 82, 90, 92. Accordingly, at the locations where the bridge sections 100, 102, 104, 106 are disposed, the width W1a of the root sections of the communication passage bead sections 53a, 53b, 63a, 63b is greater than the width W2a (see FIG. 8B) of the root sections of the communication passage bead sections 53a, 53b, 63a, 63b at other locations thereof. Further, at locations where the bridge sections 100, 102, 104, 106 are disposed, the angles α (α1, α2) on both sides of the convex shape of the communication passage bead sections 53a, 53b, 63a, 63b are smaller than the angles β (see FIG. 8B) of the convex shape of the communication passage bead sections 53a, 53b, 63a, 63b at other locations thereof. Consequently, variances that occur in the surface pressure between regions where the bridge sections 100, 102, 104, 106 are provided and other regions in the communication passage bead sections 53a, 53b, 63a, 63b can be reduced to a small amount.

The present invention is not limited to the embodiments described above, and various modifications may be made thereto without deviating from the essential scope of the present invention as set forth in the appended claims.

What is claimed is:

1. A fuel cell comprising a membrane electrode assembly in which electrodes are disposed respectively on opposite sides of an electrolyte membrane, and metallic separators arranged respectively on opposite sides of the membrane electrode assembly, wherein, on the metallic separators, provided are
    passages through which a fluid, the fluid being a fuel gas, an oxygen containing gas, or a coolant, flows in a stacking direction of the membrane electrode assembly and the metallic separators,
    fluid flow fields through which the fluid flows along surfaces of the metallic separators,
    connecting flow fields that communicate between selected passages and corresponding fluid flow fields, and
    bead seals that project in the stacking direction and surround the passages,
    wherein the connecting flow fields are formed to communicate between inner and outer sides of the bead seals,
    wherein a width of a first root section of the bead seals, at a location where the connecting flow fields are disposed, is greater than a width of a second root section of the bead seals at a location where the connecting flow fields are not disposed, and
    wherein a first angle, which is equal on both sides of a convex shape of the bead seal with respect to a plane perpendicular to a thickness direction of the bead seal at the location where the first root section is disposed, is less than a second angle on both sides of the convex shape of the bead seal with respect to the plane at the location where the second root section is disposed.

2. The fuel cell according to claim 1, wherein widths of a top section of the bead seals in a direction at which the bead seals project are equal at the location where the connecting flow fields are disposed and at the other locations thereof.

3. The fuel cell according to claim 1, wherein:
    the bead seals are formed with a wavy shape as viewed in plan; and
    at regions corresponding to apexes of bent portions forming the wavy shape on the bead seals, through holes that make up at least portions of the connecting flow fields are provided on both sides of a convex shape of the bead seals.

4. A metallic separator for a fuel cell on which there are provided
    a passage that penetrates in a thickness direction and through which a fluid flows, the fluid being a fuel gas, an oxygen containing gas, or a coolant,
    a fluid flow field through which the fluid flows along a surface of the separator,
    a connecting flow field that communicates between the passage and the fluid flow field, and
    a bead seal that projects in the thickness direction and surrounds the passage, wherein the connecting flow field is formed to communicate between inner and outer sides of the bead seal, wherein, at a location where the connecting flow field is disposed, a width of a first root section of the bead seal is greater than a width of a second root section of the bead seal at a location spaced away from the connecting flow field, and
    wherein:
    a first angle, which is equal on both sides of a convex shape of the bead seal with respect to a plane perpendicular to the thickness direction at the location where the first root section is disposed, is less than a second angle on both sides of the convex shape of the bead seal with respect to the plane at the location where the second root section is disposed.

5. The metallic separator for a fuel cell according to claim 4, wherein the bead seal is formed with a wavy shape as viewed in plan.

6. The metallic separator for a fuel cell according to claim 4, wherein a width of a top section of the bead seal in a direction at which the bead seal projects is equal at the location where the connecting flow field is disposed and at the other locations thereof.

7. The metallic separator for a fuel cell according to claim 4, wherein:
    the bead seal is formed with a wavy shape as viewed in plan; and
    at regions corresponding to apexes of bent portions forming the wavy shape on the bead seal, through holes that communicate between the passage and the flow field are provided on both sides of a convex shape of the bead seal.

8. A fuel cell comprising a membrane electrode assembly in which electrodes are disposed respectively on opposite sides of an electrolyte membrane, and metallic separators arranged respectively on opposite sides of the membrane electrode assembly,
    wherein on the metallic separators, provided are
    passages through which a fluid, the fluid being a fuel gas, an oxygen containing gas, or a coolant, flows in a stacking direction of the membrane electrode assembly and the metallic separators,
    fluid flow fields through which the fluid flows along surfaces of the metallic separators,
    at least three spaced apart connecting flow fields that communicate between a selected passage and a corresponding one of the fluid flow fields, and
    bead seals that project in the stacking direction and surround the passages,
    wherein the connecting flow fields are formed to communicate between inner and outer sides of a selected one of the bead seals,
    wherein a width of a first root section of the bead seals, at locations where the connecting flow fields are disposed, is greater than a width of a second root section of the bead seals at a location spaced away from the connecting flow fields, and wherein a first angle, which is equal on both sides of a convex shape of the bead seal with respect to a plane perpendicular to the thickness direction at the location where the first root section is disposed, is less than a second angle on both sides of the convex shape of the bead seal with respect to the plane at the location where the second root section is disposed.

9. The fuel cell according to claim 8, wherein the bead seals are formed with a wavy shape as viewed in plan.

10. The fuel cell according to claim 8, wherein widths of a top section of the bead seals in a direction at which the bead seals project are equal at the location where the connecting flow fields are disposed and at the locations between the connecting flow fields.

11. The fuel cell according to claim 8, wherein:
the bead seals are formed with a wavy shape as viewed in plan view, and
at regions corresponding to apexes of bent portions forming the wavy shape on the bead seals, through holes that make up at least portions of the connecting flow fields are provided on both sides of a convex shape of the bead seals.

* * * * *